US012722353B2

(12) United States Patent
Yang

(10) Patent No.: US 12,722,353 B2
(45) Date of Patent: Sep. 1, 2026

(54) ALL-IN-ONE MACHINE FOR FOLDING AND BOXING FRESH-KEEPING BAGS

(71) Applicant: Life Help (Jiangsu) Household Products Co., Ltd., Xinghua City (CN)

(72) Inventor: Qingjin Yang, Xinghua (CN)

( * ) Notice: Subject to any disclaimer, the term of this patent is extended or adjusted under 35 U.S.C. 154(b) by 0 days.

(21) Appl. No.: 18/881,293

(22) PCT Filed: Jul. 22, 2022

(86) PCT No.: PCT/CN2022/107224

§ 371 (c)(1),
(2) Date: Jan. 5, 2025

(87) PCT Pub. No.: WO2024/007371

PCT Pub. Date: Jan. 11, 2024

(65) Prior Publication Data

US 2026/0014771 A1 Jan. 15, 2026

(30) Foreign Application Priority Data

Jul. 5, 2022 (CN) ........................ 202210794783.X

(51) Int. Cl.
*B31B 70/26* (2017.01)
*B31B 70/04* (2017.01)
*B31B 70/16* (2017.01)

(52) U.S. Cl.
CPC .............. *B31B 70/58* (2017.08); *B31B 70/04* (2017.08); *B31B 70/16* (2017.08)

(58) Field of Classification Search
CPC ......... B31B 70/58; B31B 70/04; B31B 70/16; B31B 70/946–982
See application file for complete search history.

(56) References Cited

U.S. PATENT DOCUMENTS 3,533,331 A * 10/1970 Kugler .................... B31B 70/00
206/390
4,285,509 A * 8/1981 Reid ........................ B65H 3/26
271/10.04

(Continued)

FOREIGN PATENT DOCUMENTS

CN 205767743 U * 12/2016 ........... B31B 19/668
CN 109278356 A * 1/2019 ............. B31B 70/62

(Continued)

*Primary Examiner* — Anna K Kinsaul
*Assistant Examiner* — Mobeen Ahmed

(57) ABSTRACT

An all-in-one machine for folding and boxing fresh-keeping bags, and comprises: a base, an unwinding roller, a controller, a traction mechanism, a loosening prevention mechanism and a folding mechanism; the traction mechanism comprises a pushing assembly and four suction cups; the loosening prevention mechanism comprises a sliding assembly, a rotating assembly and a top plate; the folding mechanism comprises a cutting assembly, an edge sealing assembly and two folding assemblies; and the pushing assembly, the cutting assembly, the edge sealing assembly and the two folding assemblies are all electrically connected to the controller. The present invention can cut connected plastic bags into a plurality of equal-length fresh-keeping bags, can fold same together in a staggered S-shape and can store same.

10 Claims, 15 Drawing Sheets

(56) References Cited

U.S. PATENT DOCUMENTS

| | | | | | |
|---|---|---|---|---|---|
| 4,354,335 | A * | 10/1982 | Meyer | B65B 43/123 | 493/335 |
| 4,500,307 | A * | 2/1985 | Bridgeman | B31B 70/00 | 493/198 |
| 4,760,684 | A * | 8/1988 | Crosby | B29C 66/1122 | 493/926 |
| 4,840,609 | A * | 6/1989 | Jones | B65H 33/02 | 493/450 |
| 4,929,224 | A * | 5/1990 | Hanson | B31B 70/00 | 493/194 |
| 5,064,408 | A * | 11/1991 | Bridgeman | B31B 70/16 | 53/385.1 |
| 5,102,384 | A * | 4/1992 | Ross | B31B 70/00 | 493/243 |
| 5,952,025 | A * | 9/1999 | Yannuzzi, Jr. | B31B 70/88 | 53/469 |
| 6,042,526 | A * | 3/2000 | Baumer | B31B 70/04 | 493/243 |
| 6,416,452 | B1 * | 7/2002 | Meyer | B31B 70/18 | 493/224 |
| 6,635,002 | B1 * | 10/2003 | Yeh | B26D 7/025 | 493/203 |
| 2003/0113042 | A1 * | 6/2003 | Yeager | B65D 33/2525 | 383/203 |
| 2005/0040278 | A1 * | 2/2005 | Allgood | B65D 33/002 | 242/534 |
| 2007/0080092 | A1 * | 4/2007 | DeLuca | B65D 31/10 | 220/495.07 |
| 2010/0022375 | A1 * | 1/2010 | Colla | B31B 70/00 | 493/243 |
| 2011/0162327 | A1 * | 7/2011 | Minaud | B65B 61/186 | 53/452 |
| 2016/0318274 | A1 * | 11/2016 | Walsh | B29C 66/8511 | |
| 2017/0157881 | A1 * | 6/2017 | Kropf | B31B 70/642 | |
| 2022/0002069 | A1 * | 1/2022 | Wetsch | B65D 65/42 | |
| 2023/0159230 | A1 * | 5/2023 | Maxwell | B32B 27/306 | 383/75 |
| 2023/0398761 | A1 * | 12/2023 | Rymer | B31B 70/942 | |

FOREIGN PATENT DOCUMENTS

| | | | | |
|---|---|---|---|---|
| CN | 110065261 A | * | 7/2019 | B31B 70/005 |
| CN | 113172943 A | * | 7/2021 | B31B 70/74 |
| CN | 216507046 U | * | 5/2022 | B31B 70/64 |
| CN | 114801332 A | * | 7/2022 | B31B 70/74 |
| CN | 114394283 B | * | 11/2023 | B65B 43/18 |
| CN | 114571796 B | * | 4/2024 | B31B 70/64 |
| CN | 110450457 B | * | 1/2025 | B31B 70/74 |
| CN | 119370664 A | * | 1/2025 | B31B 70/16 |
| CN | 120327028 A | * | 7/2025 | B31B 70/16 |
| TW | 1851471 B | * | 8/2024 | B65H 45/00 |

* cited by examiner

ALL-IN-ONE MACHINE FOR FOLDING AND BOXING FRESH-KEEPING BAGS

TECHNICAL FIELD

The present invention relates to the field of folding apparatuses, and specifically relates to an all-in-one machine for folding and boxing fresh-keeping bags.

BACKGROUND TECHNOLOGY

Fresh-keeping bags mainly refer to bags made of food preservative film and are mainly used to preserve vegetables, fruits, grains, cooked food and other foods. The existing fresh-keeping bags are made into long strips and then rolled into tubes. When in use, the plastic bags must be torn out before placing items inside, which makes the operation cumbersome, inefficiency and inconvenient.

Technical Problems

1. The existing fresh-keeping bags are made into strips and then rolled into tubes. When in use, the plastic bags need to be torn out individually, which is easy to tear and inconvenient to use.
2. When the existing fresh-keeping bags are transported, the bag bodies cannot be transported straight, which makes the transport unsmooth and reduces the folding efficiency.
3. The existing folding devices are mostly composed of several mechanisms operating independently, which consume a lot of power and is not conducive to reducing the folding cost.
4. The existing folding devices are not designed with storage boxes, and the fresh-keeping bags cannot be effectively stored after being folded.

Technical Solutions

In order to solve the above technical problems, the object of the present invention is to provide an all-in-one machine for folding and boxing fresh-keeping bags.

To achieve the above purpose, the present invention adopts the following technical solutions:

Provided is an all-in-one machine for folding and boxing fresh-keeping bags, comprising: a base, an unwinding roller rotationally arranged on the base, a controller, a traction mechanism, a loosening prevention mechanism and a folding mechanism, wherein on the base is provided a support frame, the traction mechanism is arranged on the support frame for pulling rolled fresh-keeping bags, the traction mechanism comprises a pushing assembly and four suction cups, the pushing assembly is arranged on the support frame, the four suction cups are fixedly arranged on the pushing assembly, the loosening prevention mechanism is arranged between the traction mechanism and the folding mechanism to prevent the rolled fresh-keeping bags from loosening during transportation, and comprises a sliding assembly, a rotating assembly and a top plate; on the base is provided a first vertical plate, the sliding assembly is arranged on the first vertical plate, the rotating assembly is inserted on the first vertical plate, the top plate is sleeved on the rotating assembly, the folding mechanism is arranged on the base to individually fold fresh-keeping bags after being cut, and comprises a cutting assembly, an edge sealing assembly and two folding assemblies; on the base is fixedly provided a support platform, both the cutting assembly and the edge sealing assembly are arranged on the support platform, the cutting assembly is located above the edge sealing assembly, both the two folding assemblies are located below the edge sealing assembly, and the pushing assembly, the cutting assembly, the edge sealing assembly and the two folding assemblies are all electrically connected to the controller.

Further, the pushing assembly comprises an electric push rod 48, a sliding block and a mounting plate, the sliding block is arranged on the support frame, the electric push rod 48 is fixedly arranged on the support frame, an output end portion thereof is fixedly connected to the sliding block, the mounting plate is fixedly arranged on an outer wall of the sliding block at one end portion away from the electric push rod 48, the four suction cups are symmetrically arranged at bottom portions of the mounting plate, and the electric push rod 48 is electrically connected to the controller.

Further, the sliding assembly comprises a pull rope, a first rack and a return spring, on the first vertical plate is fixedly arranged a guide rail, the first rack is slidably arranged inside the guide rail, the pull rope is fixedly arranged between the mounting plate and the first rack, the return spring is fixedly arranged between an end portion of the first rack away from the pull rope and an inner wall of the guide rail, and two transmission wheels are hingedly arranged on the first vertical plate, and both the transmission wheels are sleeved with the pull rope.

Further, the rotating assembly comprises a first gear, a driving wheel, a driven wheel and a belt; a first hinge shaft and a second hinge shaft are respectively inserted on the first vertical plate; the first gear and the driving wheel are both sleeved on the first hinge shaft; the driven wheel is sleeved on the second hinge shaft; the top plate is sleeved on the second hinge shaft; the belt is sleeved between the driving wheel and the driven wheel; the first gear and the first rack are meshed and connected; and the driving wheel is larger than the driven wheel.

Further, the edge sealing assembly comprises a long-axis cylinder and two heating blocks, the long-axis cylinder is fixedly arranged on the support platform, an output end portion of the long-axis cylinder is fixedly connected to one of mounting blocks away from the long-axis cylinder, a through slot for fresh-keeping bags to pass through is provided on the support platform; the mounting blocks are slidably provided at both end portions of the through slot, the heating blocks are fixedly provided on outer walls of the mounting blocks, second racks are fixedly provided at end portions of the mounting blocks away from the long-axis cylinder, second gears are rotationally provided at end portions of the support platform close to top portions of the second racks, both the second racks are in meshed connection to the second gears, and the long-axis cylinder and the heating blocks are electrically connected to the controller.

Further, the cutting assembly comprises a cutter and a cutter holder, the cutter is fixedly arranged on one of the mounting blocks, and the cutter holder is fixedly arranged on another one of the mounting blocks, and a cutter groove is provided on the cutter holder for inserting the cutter.

Further, the folding assemblies comprise servo motors, rotating shafts and arc-shaped top blocks, the rotating shafts are inserted into outer walls of the support frame, arc-shaped top blocks are symmetrically arranged at both end portions of the rotating shafts, the servo motors are fixedly arranged on outer walls of the support platform, output end portions thereof are fixedly connected to end portions of the rotating shafts, and the servo motors are electrically connected to a controller.

Further, a second vertical plate is fixedly provided on the base, a limit roller is rotationally provided on the second vertical plate, a conveying roller is inserted below the limit roller via a third hinge shaft, a stepper motor is fixedly provided on the second vertical plate, an output end portion of the stepper motor is fixedly connected to one end portion of the third hinge shaft, and the stepper motor is electrically connected to a controller.

Further, an arc-shaped limiting groove is fixedly provided on the support platform, a support seat is fixedly provided on the base, a storage box is provided on the support seat, and the storage box is located below the arc-shaped top blocks.

Further, a reduction motor is fixedly provided on an outer wall of the support platform, and a winding roller is fixedly provided on an output end portion of the reduction motor.

Beneficial Effects

1. The present invention designs a loosening prevention mechanism, namely, a sliding assembly, a rotating assembly and a top plate, which can abut against the bottom surfaces of the plastic bag bodies between the limiting roller and the arc-shaped limiting groove when the plastic bag bodies connected together are conveyed, thereby preventing this part of the bag bodies from being dented, and then the four suction cups drive the plastic bag bodies connected together to approach the limiting roller, and simultaneously drive the plastic bag bodies to be smoothly conveyed into the arc-shaped limiting groove without causing dents and other problems. The driving wheel is designed to be larger than the driven wheel in order to ensure that the top plate can rotate a sufficient number of times, that is, to ensure in the process of conveying a length of the fresh-keeping bags between the four arc-shaped top blocks in the arc-shaped limiting groove, the plastic bag bodies can make multiple contacts with bottom surfaces of the plastic bag bodies between the limiting roller and the top of the arc-shaped limiting groove, thereby further improving the anti-loosening effect of this part of the plastic bag bodies. At the same time, multiple contacts with the plastic bag bodies are conducive to gathering the air inside the bags at the opening. When cutting next time, the gathered air is quickly discharged from the openings of the fresh-keeping bags, thereby ensuring the smooth progress of the subsequent folding and storage processes. At the same time, no negative pressure machine is required, thereby reducing the transportation cost of the fresh-keeping bags.
2. By designing two folding assemblies, the fresh-keeping bags can be quickly folded into an S shape after sealing and cutting end portions of the bags, and can be staggered with next fresh-keeping bags. Compared with the existing technology, when in use, it can be quickly taken out without tearing, ensuring the integrity of the bags. At the same time, it will not cause joint phenomenon when taking them out, which is convenient and quick.
3. By designing the pull rope, the first rack and the reset spring, the traction mechanism and the loosening prevention mechanism can be designed in linkage, so that the two mechanisms can operate synchronously, that is, while conveying the connected plastic bag bodies, the bottom surface can be touched multiple times synchronously, so as to flatten the concave part, and ensure that the plastic bag bodies are conveyed as straight as possible, thereby ensuring that it can smoothly enter between the four arc-shaped top blocks, which is convenient for quick folding. At the same time, the cutting assembly and the edge sealing assembly are designed together, and the two share a driving source. While sealing one end of the fresh-keeping bags, equal-length cutting is performed, and two operations are completed at one time. Compared with the existing technology, not only the overall number of driving sources used is reduced, and the power consumption of the machine is reduced, but it is also beneficial to reduce the overall structure of the machine and reduce the cost of the machine.
4. Through the design of the unwinding roller, controller, traction mechanism, loosening prevention mechanism and folding mechanism, through the cooperation of the five, the integrated process of conveying, edge sealing, cutting, folding and storing of the fresh-keeping bags can be completed at one time. Compared with the existing technology, it not only realizes the processing of multiple processes of fresh-keeping bag processing, but also makes the processing more efficient and reasonable.
5. In another embodiment, by designing a reduction motor and a winding roller, a plurality of continuous fresh-keeping bags folded together can be automatically rolled up, thereby facilitating the rolling process, meeting different packaging requirements, adapting to market demand, increasing market share, and expanding corporate profits.

BRIEF DESCRIPTION OF THE DRAWINGS

In order to more clearly illustrate the technical solution of the embodiment of the present invention, the drawings in the embodiment of the present invention are briefly introduced below.

Figure 1:
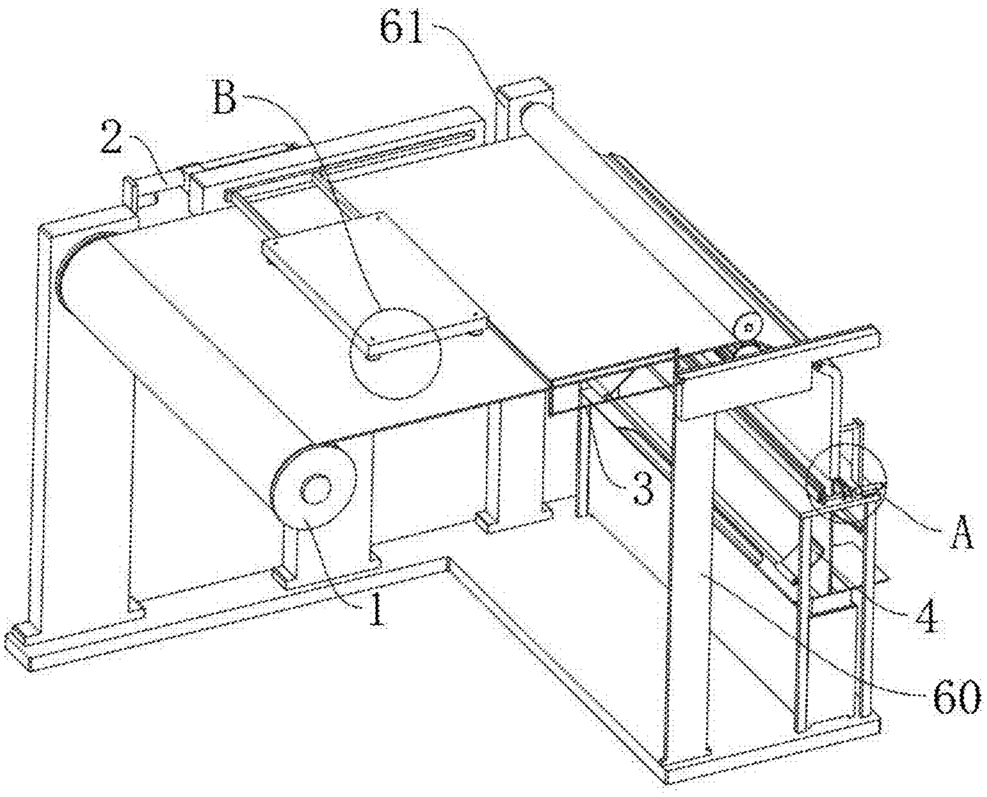
FIG. 1 is a schematic diagram of the three-dimensional structure of the present invention.
Figure 2:
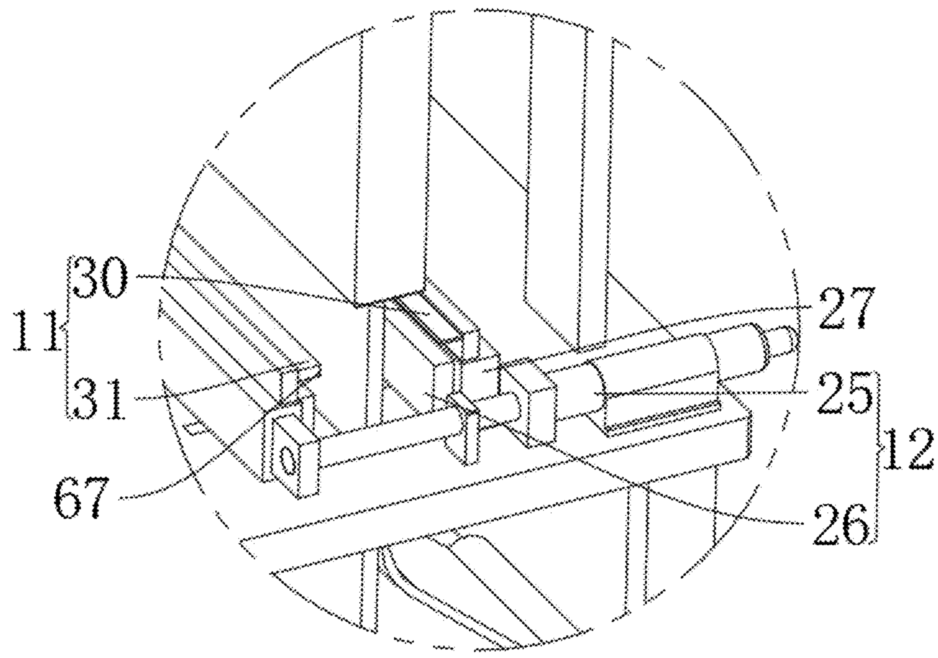
FIG. 2 is an enlarged view of point A in FIG. 1.
Figure 3:
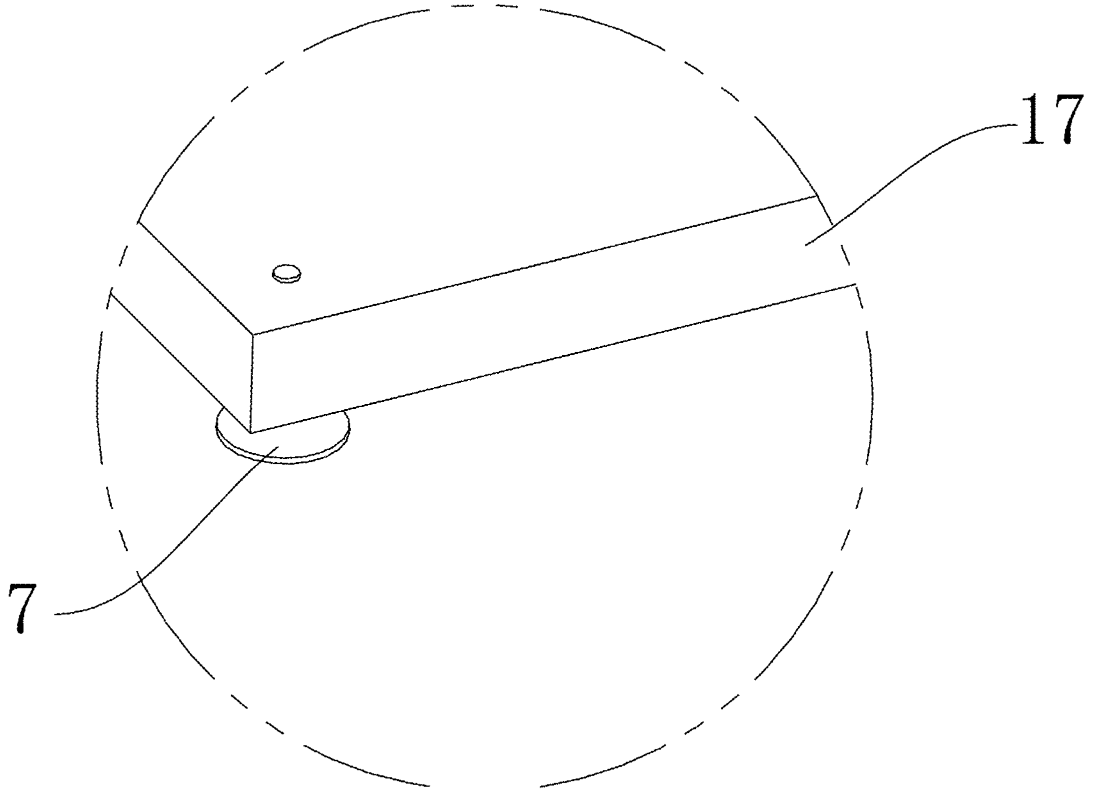
FIG. 3 is an enlarged view of point B in FIG. 1.
Figure 4:
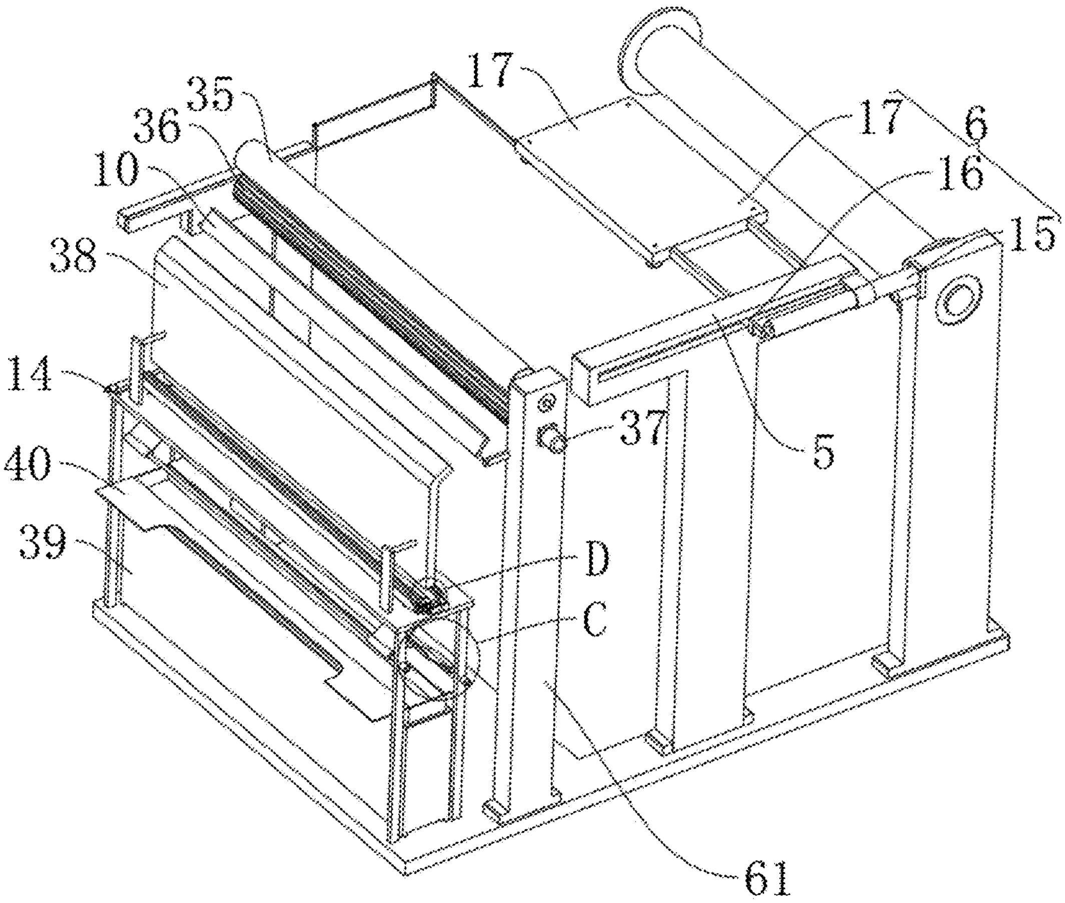
FIG. 4 is a schematic diagram of a three-dimensional structure of the present invention.
Figure 5:
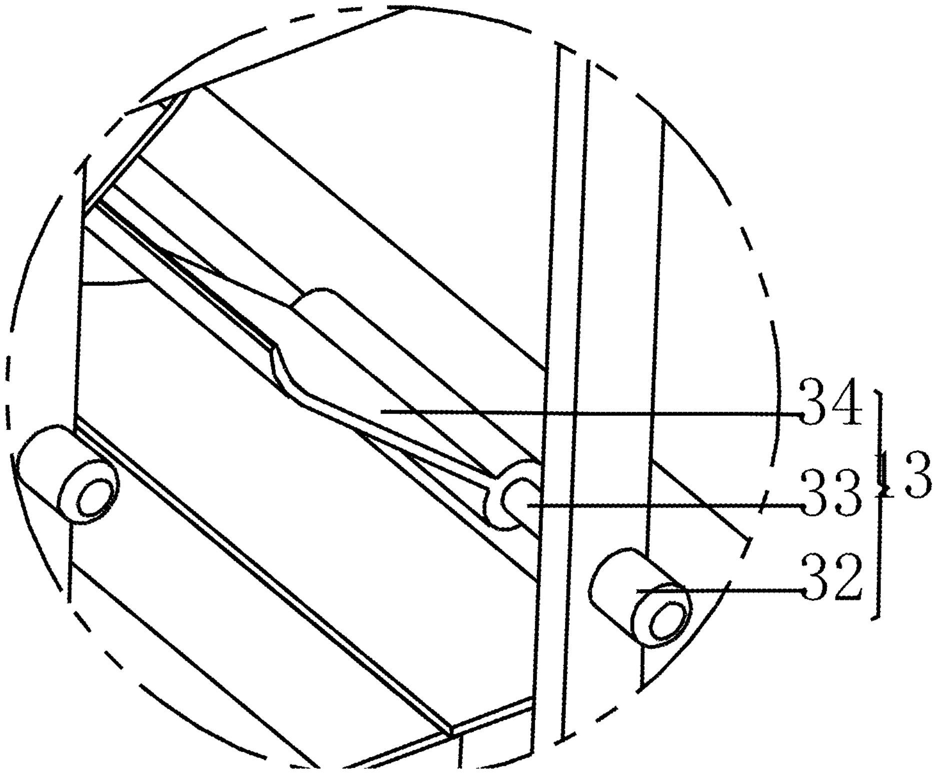
FIG. 5 is an enlarged view of point C in FIG. 4.
Figure 6:
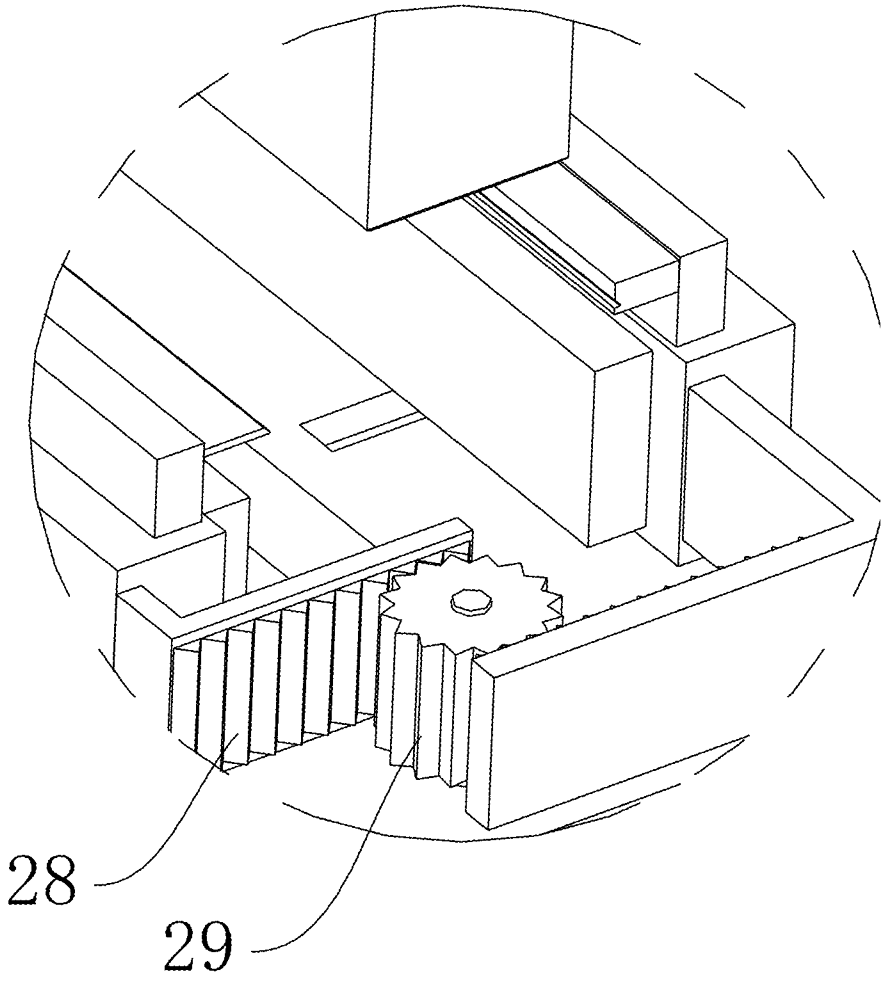
FIG. 6 is an enlarged view of point D in FIG. 4.
Figure 7:
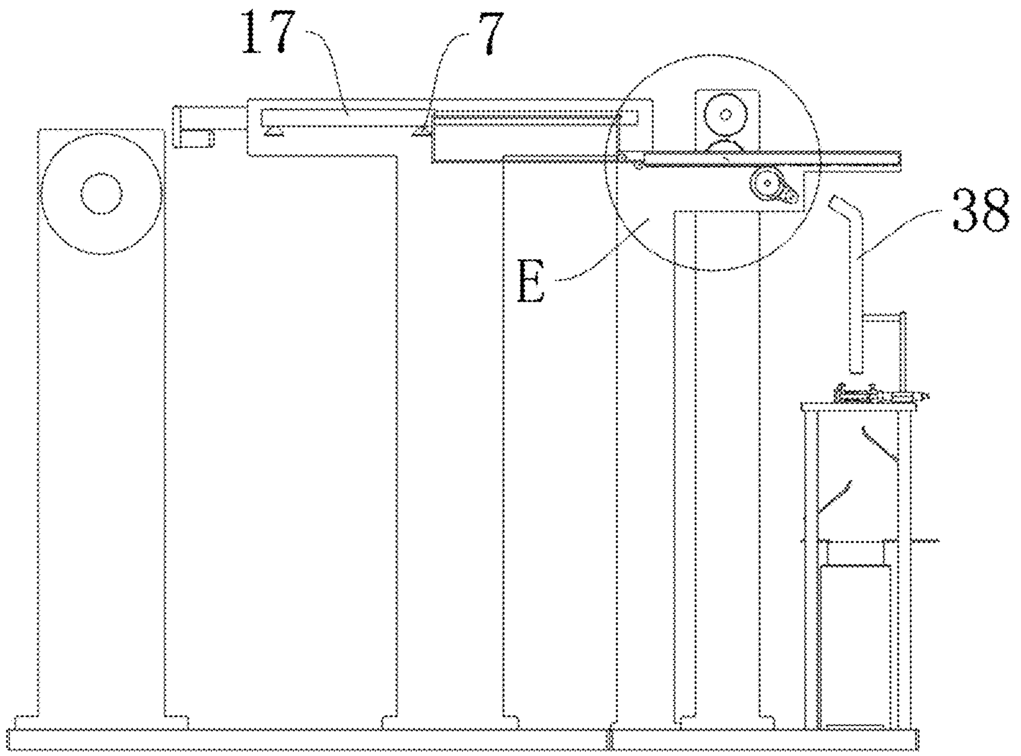
FIG. 7 is a front view of the present invention.
Figure 8:
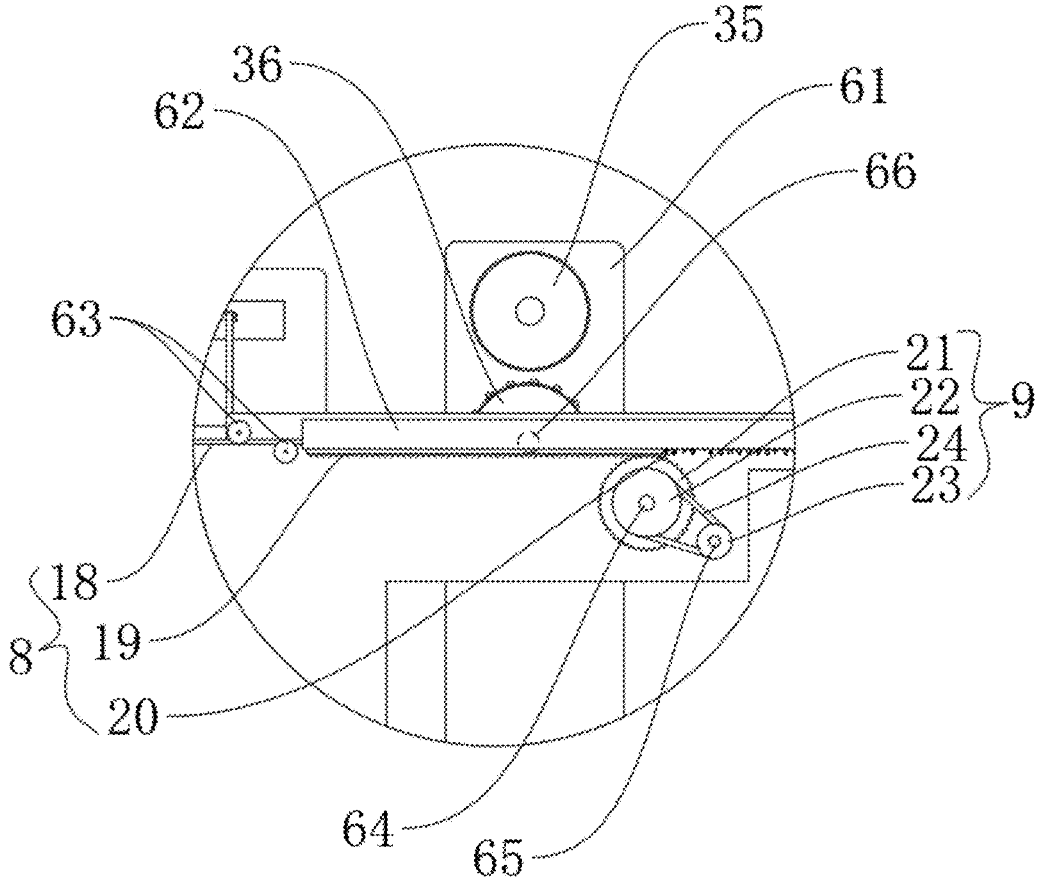
FIG. 8 is an enlarged view of point E in FIG. 4.
Figure 9:
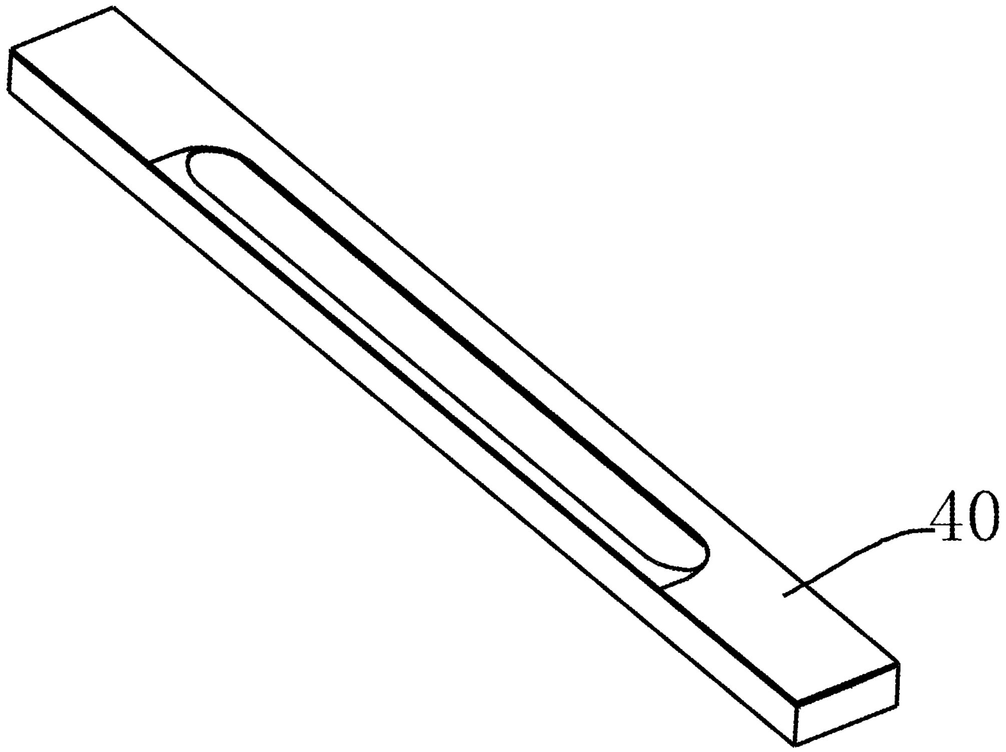
FIG. 9 is a schematic diagram of the three-dimensional structure of the storage box after sealing of the present invention.

The markups in the drawings are indicated as follows:

1—unwinding roller;
2—traction mechanism;
3—loosening prevention mechanism;
5—support frame;
6—pushing assembly;
7—suction cup;
8—sliding assembly;
9—rotating assembly;

10—top plate;
11—cutting assembly;
12—edge sealing assembly;
13—folding assembly;
14—support platform;
15—electric push rod 48;
16—sliding block;
17—mounting plate;
18—pull rope;
19—first rack;
20—return spring;
21—first gear;
22—driving wheel;
23—driven wheel;
24—belt;
25—long-axis cylinder;
26—heating block;
27—mounting block;
28—second rack;
29—second gear;
30—cutter;
31—cutter holder;
32—servo motor;
33—rotating shaft;
34—arc-shaped top block;
35—limit roller;
36—conveying roller;
37—stepper motor;
38—arc-shaped limiting groove;
39—support seat;
40—storage box;
41—reduction motor;
42—winding roller;
43—driving assembly;
44—electrical control assembly;
45—transmission roller;
46—push rod;
47—pressure rod;
48—electrical control push rod;
49—third rack;
50—third gear;
51—traction rope;
52—fourth rack;
53—fourth gear;
54—tension spring;
55—lower stopper;
56—upper stopper;
57—storage slot;
58—baffle;
59—protective shell;
60—first vertical plate;
61—second vertical plate;
62—guide rail;
63—transmission wheel;
64—first hinge shaft;
65—second hinge shaft;
66—third hinging shaft; and
67—cutter groove.

EMBODIMENTS OF THE PRESENT INVENTION

The technical solutions of the present invention are further described below with reference to the accompanying drawings and through specific embodiments.

Among them, the drawings are only used for illustrative purposes and represent only schematic diagrams rather than actual pictures, and should not be understood as limitations on this patent; in order to better illustrate the embodiments of the present invention, some parts of the drawings will be omitted, enlarged or reduced, and do not represent the size of the actual product.

Embodiment 1

Please refer to FIGS. 1-9, an all-in-one machine for folding and boxing fresh-keeping bags, and comprising: a base, an unwinding roller 1 rotationally arranged on the base, a controller, a traction mechanism 2, a loosening prevention mechanism 3 and a folding mechanism, wherein on the base is provided a support frame 5, the traction mechanism 2 is arranged on the support frame 5 for pulling rolled fresh-keeping bags, the traction mechanism 2 comprises a pushing assembly 6 and four suction cups 7, the pushing assembly 6 is arranged on the support frame 5, the four suction cups 7 are fixedly arranged on the pushing assembly 6, the loosening prevention mechanism 3 is arranged between the traction mechanism 2 and the folding mechanism to prevent the rolled fresh-keeping bags from loosening during transportation, and comprises a sliding assembly 8, a rotating assembly 9 and a top plate 10; on the base is provided a first vertical plate, the sliding assembly 8 is arranged on the first vertical plate, the rotating assembly 9 is inserted on the first vertical plate, the top plate 10 is sleeved on the rotating assembly 9, the folding mechanism is arranged on the base to individually fold fresh-keeping bags after being cut, and comprises a cutting assembly 11, an edge sealing assembly 12 and two folding assemblies 13; on the base is fixedly provided a support platform 14, both the cutting assembly 11 and the edge sealing assembly 12 are arranged on the support platform 14, the cutting assembly 11 is located above the edge sealing assembly 12, both the two folding assemblies 13 are located below the edge sealing assembly 12, and the pushing assembly 6, the cutting assembly 11, the edge sealing assembly 12 and the two folding assemblies 13 are all electrically connected to the controller.

Further, the pushing assembly 6 comprises an electric push rod 48 15, a sliding block 16 and a mounting plate 17, the sliding block 16 is arranged on the support frame 5, the electric push rod 48 15 is fixedly arranged on the support frame 5, an output end portion thereof is fixedly connected to the sliding block 16, the mounting plate 17 is fixedly arranged on an outer wall of the sliding block 16 at one end portion away from the electric push rod 48 15, the four suction cups 7 are symmetrically arranged at bottom portions of the mounting plate 17, and the electric push rod 48 15 is electrically connected to the controller. When a first fresh-keeping bag is folded and cut, the electric push rod 48 15 is started by the controller, so that its output end portion is extended. Since its output end portion is fixedly connected to the sliding block 16, the sliding block 16 is fixedly connected to the mounting plate 17, and the four suction cups 7 are fixedly connected to the bottom portions of the mounting plate 17, the connected plastic bag bodies are just located at the bottom of the four suction cups 7. In addition, the unwinding roller 1 is rotationally connected to the bottom, so that connected plastic bag bodies on the unwinding roller 1 are unwound through the four suction cups 7, that is, transported to an end portion close to the limiting roller 35.

Further, the sliding assembly 8 comprises a pull rope 18, a first rack 19 and a return spring 20, on the first vertical plate is fixedly arranged a guide rail, the first rack 19 is slidably arranged inside the guide rail, the pull rope 18 is fixedly arranged between the mounting plate 17 and the first rack 19, the return spring 20 is fixedly arranged between an end portion of the first rack 19 away from the pull rope 18 and an inner wall of the guide rail, and two transmission wheels are hingedly arranged on the first vertical plate, and both the transmission wheels are sleeved with the pull rope 18. While the plastic bag bodies are being transported toward one end portion close to the limit roller 35, the mounting plate 17 and the first rack 19 are fixedly connected to two end portions of the pull rope 18 respectively, the first rack 19 is slidably connected to the guide rail, and since an initial state of the reset spring 20 is an extended state, the end portion of the first rack 19 away from the pull rope 18 and the inner wall of the guide rail are fixedly connected to the two end portions of the reset spring 20 respectively. Therefore, when the mounting plate 17 slides toward the end portion close to the limit roller 35, the pull rope 18 will relax, thereby driving the first rack 19 to slide inside the guide rail toward the end portion close to the arc-shaped limiting groove 38. The two transmission wheels play a guiding role to ensure that the pull rope 18 can slide back and forth smoothly.

Further, the rotating assembly 9 comprises a first gear 21, a driving wheel 22, a driven wheel 23 and a belt 24; a first hinge shaft and a second hinge shaft are respectively inserted on the first vertical plate; the first gear 21 and the driving wheel 22 are both sleeved on the first hinge shaft; the driven wheel 23 is sleeved on the second hinge shaft; the top plate 10 is sleeved on the second hinge shaft; the belt 24 is sleeved between the driving wheel 22 and the driven wheel 23; the first gear 21 and the first rack 19 are meshed and connected; and the driving wheel 22 is larger than the driven wheel 23. When the first rack 19 slides inside the guide rail toward one end portion close to the arc-shaped limit groove 38, since the first gear 21 and the driving wheel 22 are both sleeved with the first hinge shaft, the first gear 21 and the first rack 19 are meshed and connected, thereby driving the gear to rotate clockwise. Since the driving wheel 22 and the driven wheel 23 are sleeved with the belt 24, the driving wheel 22 is coaxial with the first gear 21, thereby driving the second hinge shaft to rotate clockwise. In addition, the top plate 10 is sleeved with the second hinge shaft, thereby driving the top plate 10 to rotate clockwise, and the bottom surfaces of the plastic bag bodies between the limit roller 35 and the arc-shaped limit groove 38 are abutted against, thereby preventing this part of the bag bodies from being concave, thereby making the four suction cups 7 drive the connected plastic bag bodies to approach the limit roller 35 while simultaneously driving the plastic bag bodies. The bag bodies are smoothly transported into the arc-shaped limiting groove 38 without causing problems such as sinking, and while transporting the plastic bag bodies, the plastic bag bodies are prevented from floating around to avoid affecting the folding work. The driving wheel 22 is designed to be larger than the driven wheel 23 to ensure that the top plate 10 can rotate a sufficient number of times, that is, to ensure that the plastic bag bodies are transported from the arc-shaped limiting groove 38 to between four arc-shaped top blocks 34 in the process of conveying a length of the fresh-keeping bags, and the bottom surfaces of the plastic bag bodies between the limiting roller 35 and the top of the arc-shaped limiting groove 38 can be repeatedly touched, further enhancing the anti-loosening effect of this part of the plastic bag bodies. At the same time, multiple resistances to the plastic bag bodies are conducive to the gathering of air inside the opening, so that the gathered air is quickly discharged from the opening of the fresh-keeping bag during the next cutting, thereby ensuring that the subsequent folding and storage processes proceed smoothly.

Further, the edge sealing assembly 12 comprises a long-axis cylinder 25 and two heating blocks 26, the long-axis cylinder 25 is fixedly arranged on the support platform 14, an output end portion of the long-axis cylinder 25 is fixedly connected to one of mounting blocks 27 away from the long-axis cylinder 25, a through slot for fresh-keeping bags to pass through is provided on the support platform 14; the mounting blocks 27 are slidably provided at both end portions of the through slot, the heating blocks 26 are fixedly provided on outer walls of the mounting blocks 27, second racks 28 are fixedly provided at end portions of the mounting blocks 27 away from the long-axis cylinder 25, second gears 29 are rotationally provided at end portions of the support platform 14 close to top portions of the second racks 28, both the second racks 28 are in meshed connection to the second gears 29, and the long-axis cylinder 25 and the heating blocks 26 are electrically connected to the controller. After the plastic bag bodies are clamped between the four arc-shaped top blocks 34, the long-axis cylinder 25 and the two heating blocks 26 are started by the controller, thereby contracting the output end thereof. Since the output end of the long-axis cylinder 25 is fixedly connected to one of the mounting blocks 27 away from it, each mounting block 27 is slidably connected to the support platform 14, and since each second rack 28 is fixedly connected to a mounting block 27, the two second racks 28 are in meshed connection to the second gear 29, and each heating block 26 is fixedly connected to a mounting block 27, the two heating blocks 26 are driven to seal the top of the protruding part of the plastic bag bodies.

Further, the cutting assembly 11 comprises a cutter 30 and a cutter holder 31, the cutter 30 is fixedly arranged on one of the mounting blocks 27, and the cutter holder 31 is fixedly arranged on another one of the mounting blocks 27, and a cutter groove is provided on the cutter holder 31 for inserting the cutter 30. Since the cutter 30 and the cutter holder 31 are fixedly connected to the tops of the two mounting blocks 27 respectively, the top of protruding portions of the plastic bag bodies after edge sealing are cut off synchronously while the edge is sealed, thereby completing the production of the first fresh-keeping bag.

Further, the folding assemblies 13 comprise servo motors 32, rotating shafts 33 and arc-shaped top blocks 34, the rotating shafts 33 are inserted into outer walls of the support frame 5, arc-shaped top blocks 34 are symmetrically arranged at both end portions of the rotating shafts 33, the servo motors 32 are fixedly arranged on outer walls of the support platform 14, output end portions thereof are fixedly connected to end portions of the rotating shafts 33, and the servo motors 32 are electrically connected to a controller. When the free end of the plastic bag bodies just hangs between the four arc-shaped top blocks 34, the servo motor 32 is started by the controller, thereby driving the rotating shaft 33 to rotate toward one end of the plastic bag bodies. Since each two arc-shaped top blocks 34 are sleeved with one rotating shaft 33, the two arc-shaped top blocks 34 are driven to fit with the surface of one end of the plastic bag bodies, thereby cooperating with another folding assembly 13 to fold the plastic bag bodies. The plastic bag bodies are clamped between the four arc-shaped top blocks 34. At this time, the plastic bag bodies are in a slightly bent state. After the first fresh-keeping bag is made and cut, the controller continues to drive the four arc-shaped top blocks 34 to rotate towards each other, so as to continue to fold the fresh-keeping bag that was slightly bent before, until it is folded into an S shape. After it is folded into an S shape, the two arc-shaped top blocks 34 at the lower position are reset, and the two arc-shaped top blocks 34 at the higher position do not need to be completely reset, that is, the top of the first fresh-keeping bag is supported, and then the plastic bag bodies continue to be transported between the four arc-shaped top blocks 34 until its free end is just transported to between the top of the previous fresh-keeping bag and the fold, and then the two arc-shaped top blocks 34 are reset by the servo motor 32, and then the second fresh-keeping bag is folded, and so on, it can be achieved that a fresh-keeping bag can be quickly folded after it is made, and all fresh-keeping bags can be folded together alternately in an S shape, and no joint phenomenon will occur when they are subsequently drawn out, and only one sheet can be drawn out at a time, effectively avoiding waste.

Further, a second vertical plate is fixedly provided on the base, a limit roller 35 is rotationally provided on the second vertical plate, a conveying roller 36 is inserted below the limit roller 35 via a third hinge shaft, a stepper motor 37 is fixedly provided on the second vertical plate, an output end portion of the stepper motor 37 is fixedly connected to one end portion of the third hinge shaft, and the stepper motor 37 is electrically connected to a controller. The limiting roller 35 is used to slightly press the top surface of the connected plastic bags to prevent the top plate 10 from touching the bottom surfaces of the plastic bag bodies and causing the plastic bag bodies to float around, thereby playing a limiting effect. The surface of the limiting roller 35 is relatively smooth, which plays an auxiliary conveying effect. The outer wall of the conveying roller 36 is rougher than that of the limiting roller 35. While the four suction cups 7 drive the plastic bag bodies to push toward one end of the arc-shaped limiting groove 38, the stepping motor 37 is started synchronously, thereby driving the conveying roller 36 to rotate, and utilizing the friction between the conveying roller 36 and the bottom surfaces of the plastic bag bodies to drive the plastic bag bodies to be conveyed forward, thereby preventing the four suction cups 7 from causing the plastic bag bodies to bend when conveying them.

Further, an arc-shaped limiting groove 38 is fixedly provided on the support platform 14, When a fresh-keeping bag is folded, the connected plastic bag bodies are first rolled onto the outer wall of the unwinding roller 1, and then a free end is passed under the four suction cups 7 and between the limiting roller 35 and the conveying roller 36 until it vertically passes through the bottom of the arc-shaped limiting groove 38, and the vertical passing length just meets the length of a fresh-keeping bag, and the vertical passing part is just located between the four arc-shaped top blocks 34.

Further, a support seat 39 is fixedly provided on the base, a storage box 40 is provided on the support seat 39, and the storage box 40 is located below the arc-shaped top blocks 34. After the plastic bag bodies are cut and folded into several fresh-keeping bags in an S-shape and temporarily stored in the storage box 40, one of the servo motors 32 is started by the controller, thereby driving the two lower arc-shaped top blocks 34 to rotate toward one end close to the storage box 40, thereby squeezing the tops of the several folded fresh-keeping bags and compressing them into a tightly stacked state, which not only increases the storage space of the storage box 40, but also facilitates the secondary squeezing of the residual air inside all the fresh-keeping bags to ensure that the air is completely discharged and improve the processing quality of the fresh-keeping bags.

After the storage box 40 is full, the worker can take it out from the support seat 39, and then glue the sealing paper boards at the two ends of the top together with glue. A removal hole is provided between the two sealing paper boards, which facilitates the extraction of the fresh-keeping bags, making them ready for use and improving convenience.

Embodiment 2

Multiple independent fresh-keeping bags are made by cutting connected plastic bag bodies after heat-pressing sealing.

The multiple fresh-keeping bags after cutting are sequentially transferred to the electrostatic coating device for electrostatic coating. The electrostatic coating device comprises four arc-shaped top blocks 34. Each arc-shaped top block 34 is provided with an electrostatic generator. The arc-shaped top block 34 rotates to apply static electricity to the surface of each fresh-keeping bag when it falls into the storage box 40. When the adjacent next fresh-keeping bag piece is transported and ejected by the arc-shaped limiting groove 38 and falls into the storage box 40, its front end portion partially overlaps with the rear end portion of the previous fresh-keeping bag through electrostatic adsorption. The arc-shaped top blocks 34 continue to rotate to electrostatically coat the next fresh-keeping bag piece, so as to form continuous strip-shaped fresh-keeping bag bodies with partial overlapping connection.

The strip-shaped fresh-keeping bag bodies that are partially overlapped and adhered to each other by static electricity and connected head to tail are automatically stacked in an S shape inside the storage box 40, so that single-piece continuous extraction of the tear-free fresh-keeping bag packaging assembly can be achieved.

In a preferred embodiment, the step of eliminating the static electricity on the plastic bag bodies connected together is also included before the hot-pressing and sealing step. Using a static electricity eliminator to eliminate the static electricity on the plastic bag bodies connected together can, on the one hand, avoid the static electricity on the front of the fresh-keeping bags with the opposite polarity to the static electricity coated by the static coating device to offset the static electricity of the coating parts, thereby ensuring the static adsorption capacity between the fresh-keeping bags; in addition, the static electricity polarity and size subsequently applied to the fresh-keeping bag bodies can be more uniform, further ensuring the static adsorption force between the bag bodies. In a preferred embodiment, during the static coating, the static voltage applied to the fresh-keeping bag bodies by the static generator is not less than 30 kilovolts.

Embodiment 3

Figure 10:
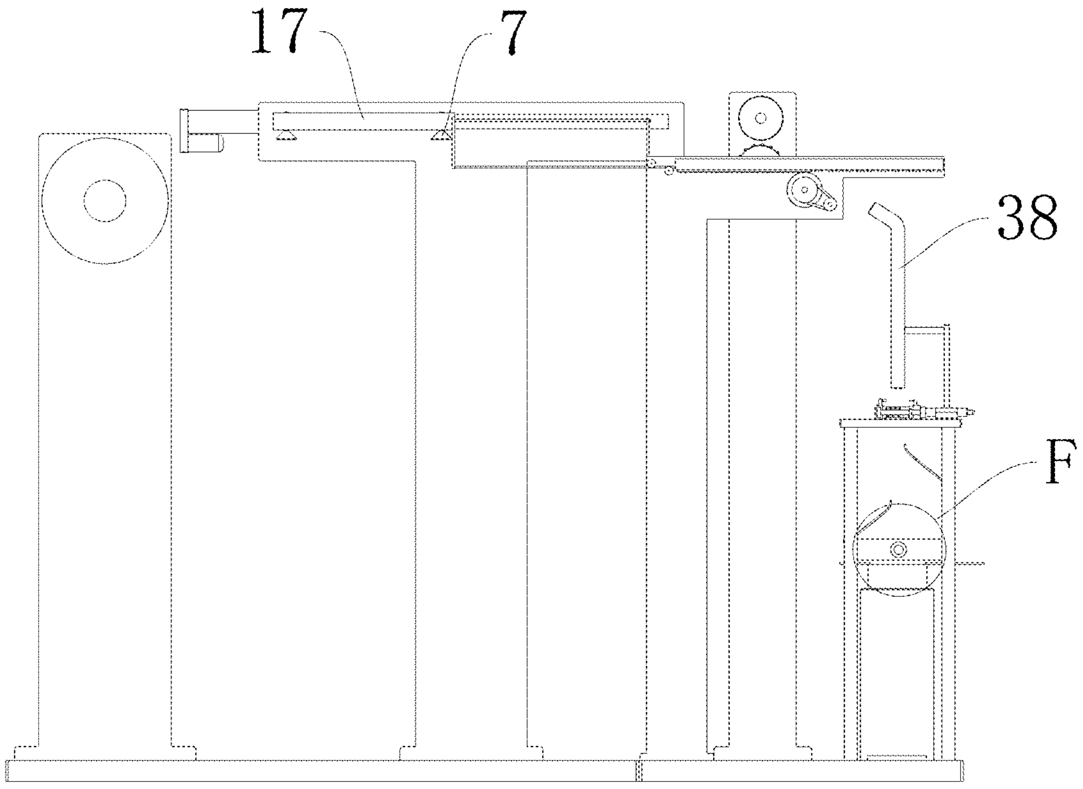
FIG. 10 is a second front view of the present invention.
Figure 11:
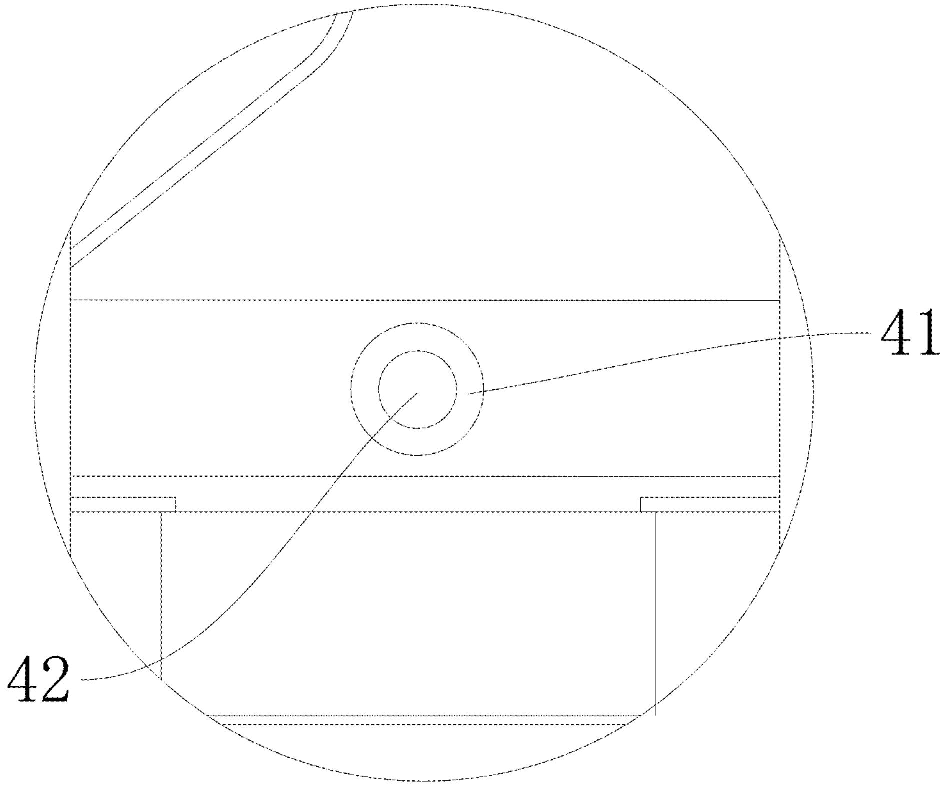
FIG. 11 is an enlarged view of F in FIG. 10.

Please refer to FIGS. 10 and 11, a reduction motor 41 is fixedly provided on the outer wall of the support platform 14, and a winding roller 42 is fixedly provided on the output end portion thereof. Preferably, an electrostatic generator is fixedly provided inside each arc-shaped top block 34. When the four arc-shaped top blocks 34 are folding the fresh-keeping bags, the electrostatic generator emits static electricity to electrostatically coat the upper and lower ends of the first fresh-keeping bag, so that the bottom end portions of the first fresh-keeping bag is tightly attached to the outer wall of the winding roller due to static electricity, and the adjacent subsequent fresh-keeping bag is automatically adsorbed together due to static electricity when it overlaps with the bottom end portions of the first fresh-keeping bag, and then the subsequent fresh-keeping bag is electrostatically coated and adsorbed together with the next fresh-keeping bag, so that continuous strip-shaped fresh-keeping bags with partial overlapping connection is formed, and finally the reduction motor is started by the controller, thereby driving the winding roller on its output end portion to rotate slowly, and winding a plurality of continuous strip-shaped fresh-keeping bags to facilitate the realization of the rolling process.

Embodiment 4

Figure 12:
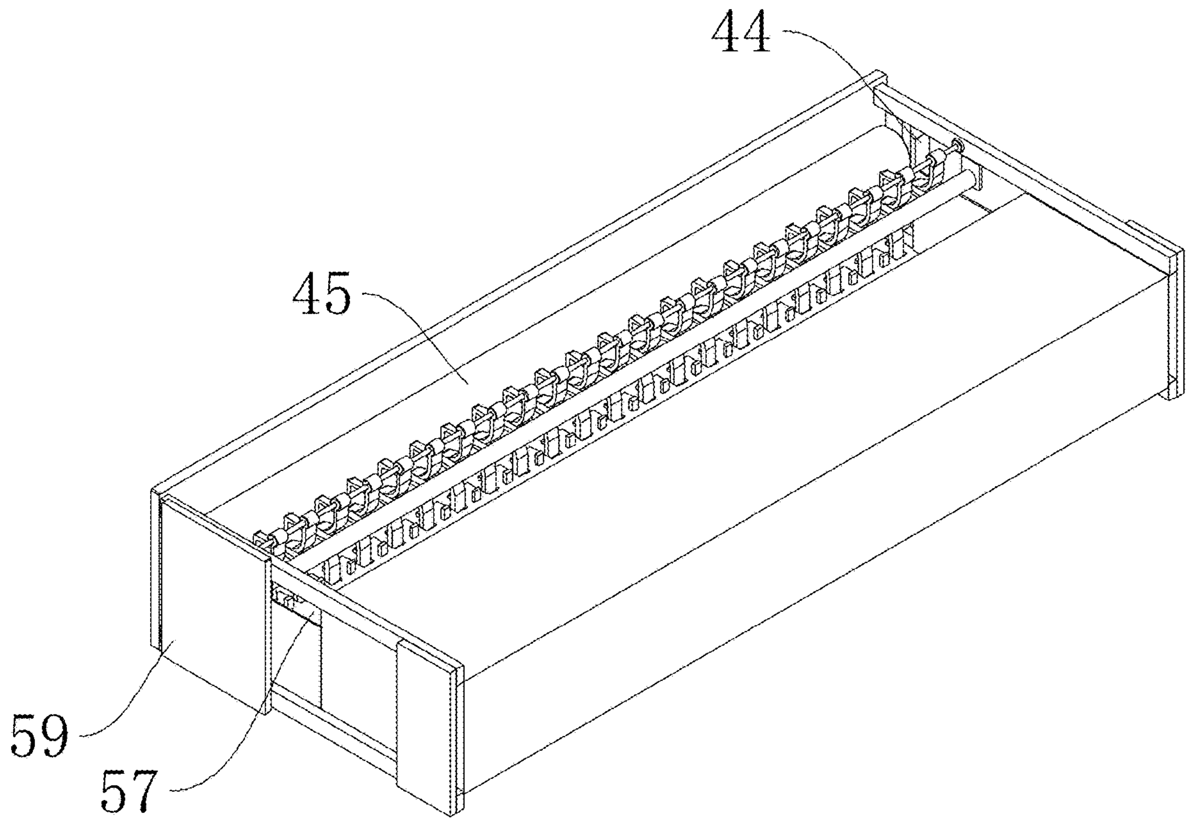
FIG. 12 is a schematic diagram of the three-dimensional structure of the support platform in the second embodiment of the present invention.
Figure 13:
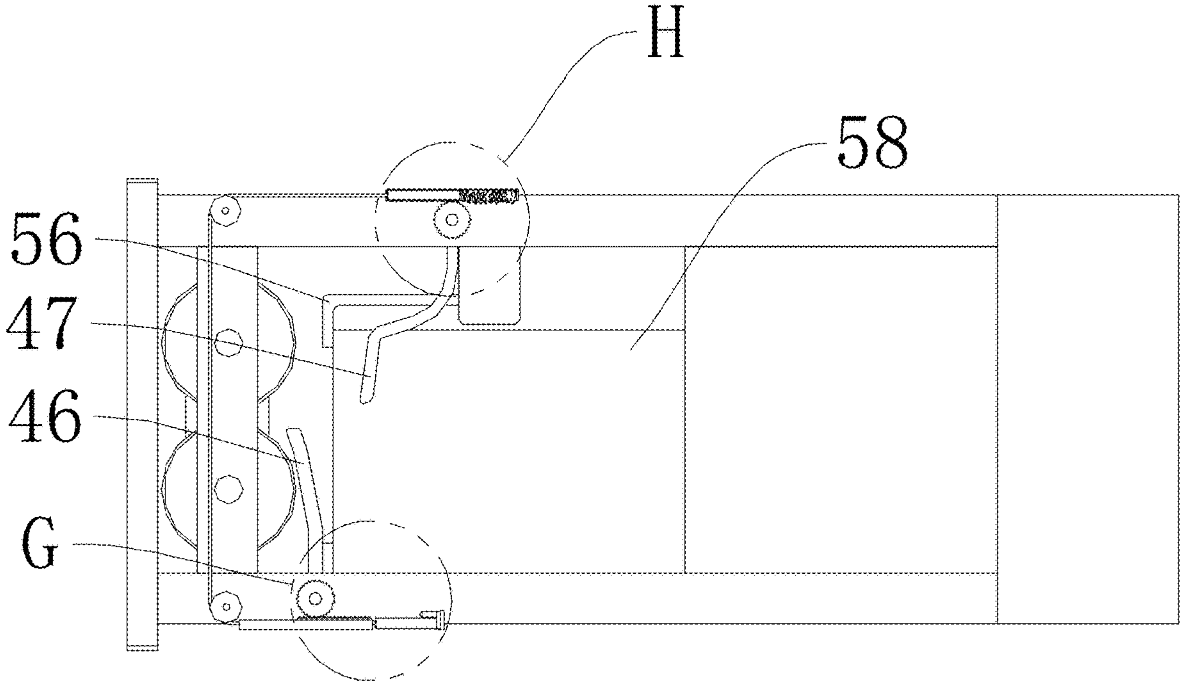
FIG. 13 is a side view of the support platform of the present invention.

Please refer to FIGS. 12 and 13, the folding mechanism comprises a driving assembly 43, an electric control assembly 44, two conveying rollers 45, levers 46 and pressure rods 47. The two conveying rollers 45 are rotationally arranged at one end of the support platform close to the through slot. The electric control assembly 44 is arranged on an outer wall of the support platform to drive the two conveying rollers 45 to rotate synchronously in the opposite direction. The levers 46 and the pressure rods 47 are respectively and equidistantly arranged at top and bottom portions of the support platform. The driving assembly 43 is arranged on an outer wall of one end portion of the support platform. The electric control assembly 44 and the driving assembly 43 are electrically connected to the controller.

Figure 14:
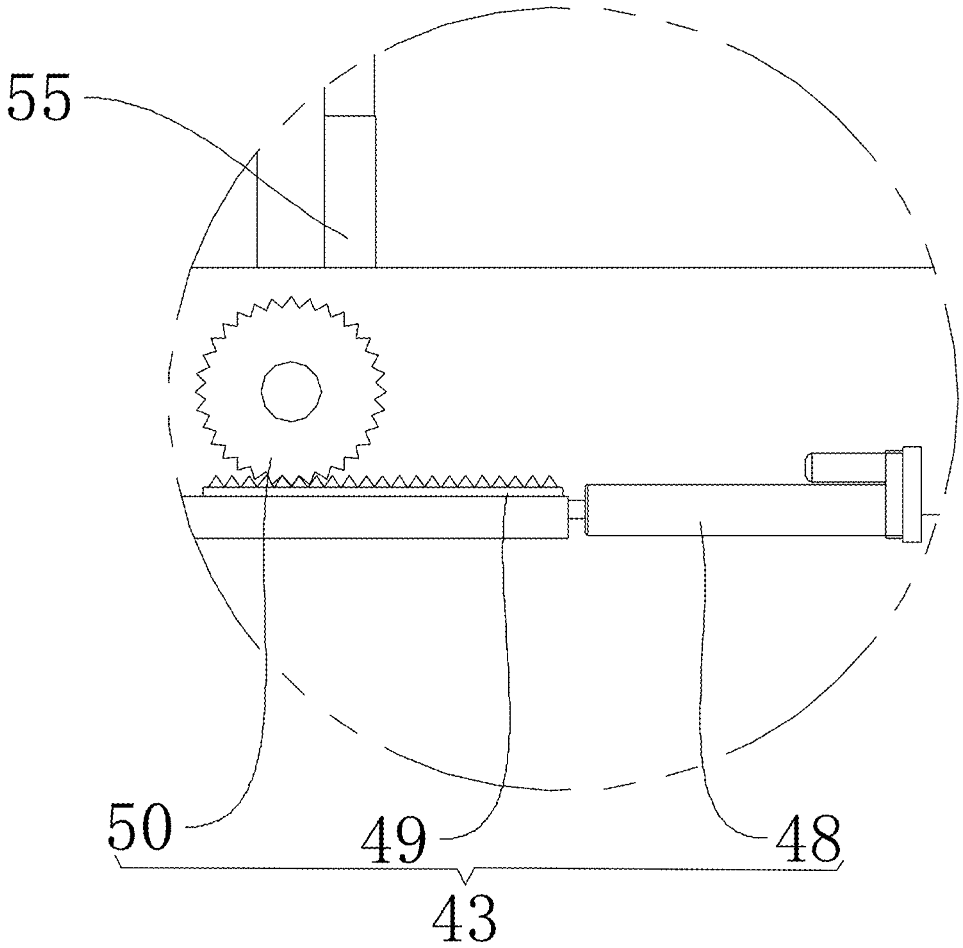
FIG. 14 is an enlarged view of G in FIG. 13.
Figure 15:
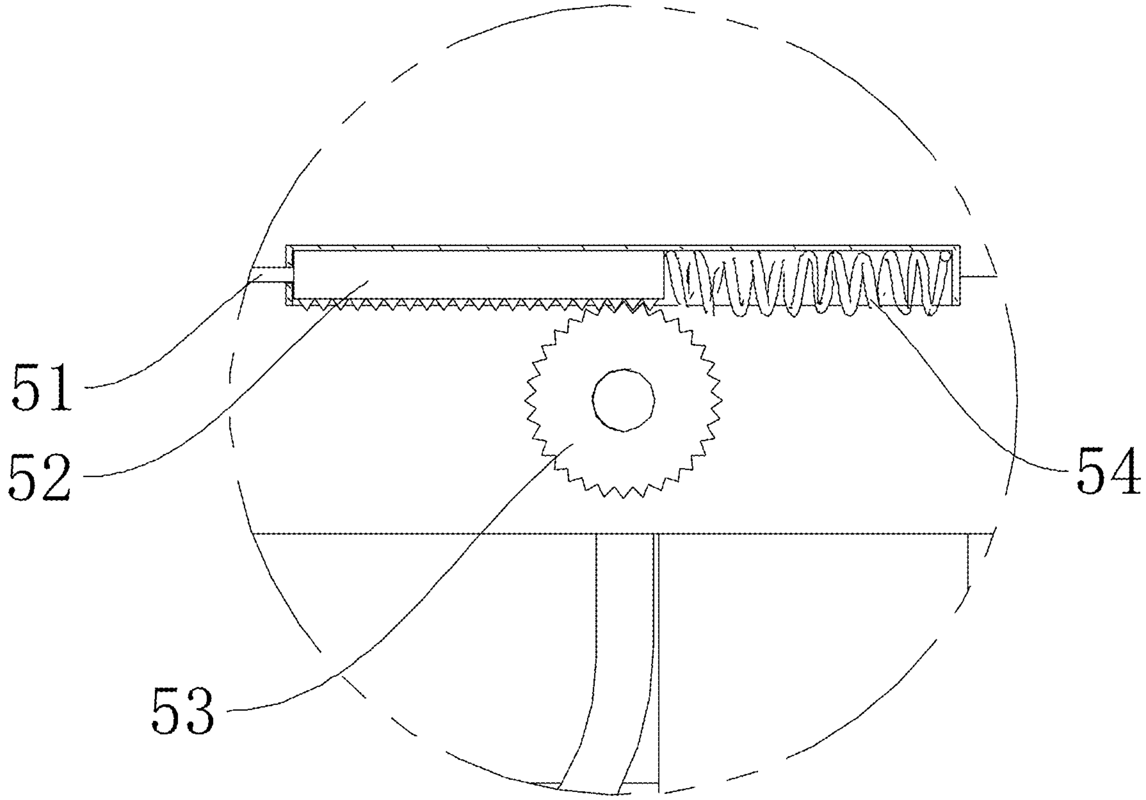
FIG. 15 is an enlarged view of H in FIG. 13.

Please refer to FIGS. 14 and 15, the driving assembly 43 comprises an electric control push rod 48, a third rack 49 and a third gear 50. The electric control push rod 48 is fixedly arranged on the bottom outer wall of the support platform, a first guide rail is fixedly arranged on the bottom outer wall of the support platform, the third rack 49 is slidably arranged inside the first guide rail, the output end portion of the electric control push rod 48 is fixedly connected to one end portion of the third rack 49, a first rotating shaft is inserted at the bottom of the support platform, each of the levers 46 is fixedly connected to the outer wall of the first rotating shaft, the third gear 50 is sleeved on one end portion of the first rotating shaft, the third rack 49 and the third gear 50 are meshed and connected, a traction rope 51 is fixedly arranged on the end portion of the third rack 49 away from the electric control push rod 48, a second guide rail is fixedly arranged on the top outer wall of the support platform, a fourth rack 52 is slidably arranged inside the second guide rail, and the end portion of the traction rope 51 away from the third rack 49 is fixedly connected to one end portion of the fourth rack 52, a second rotating shaft is inserted into the top outer wall of the support platform, each of the pressure rods 47 is fixedly connected to the outer wall of the second rotating shaft, a fourth gear 53 is sleeved on one end portion of the second rotating shaft, the fourth rack 52 is meshingly connected with the fourth gear 53, and a tension spring 54 is fixedly provided between the inner wall of the second guide rail and an end portion of the fourth rack 52 away from the traction rope 51.

Please refer to FIGS. 13 and 14, lower stoppers 55 are vertically provided on sides of the levers 46, upper stoppers 56 are fixedly provided on sides of pressure rods 47, a storage groove 57 is provided inside the support platform, baffles 58 are fixedly provided at both ends of the storage groove 57, and a protective shell 59 is fixedly provided on the outer wall of the support platform.

It should be noted that, in the present embodiment, the support platform is arranged horizontally.

Working principle: after the connected plastic bag bodies pass through the through groove and enter between the two conveying rollers 45, the controller starts the electrical control assembly 44, thereby driving the lower conveying roller 45 to rotate clockwise and the upper conveying roller 45 to rotate counterclockwise, thereby driving the continuous plastic bag bodies to be transported between the levers 46 and the pressure rods 47.

Since the tops of the levers 46 are in contact with the outer wall of the lower conveying roller 45, when the free ends of the connected plastic bag bodies are conveyed to the tops of the levers 46, the electric control push rod 48 is activated by the controller, so that its output end extends forward. Since its output end is fixedly connected to the third rack 49, the third rack 49 is driven to extend toward the end away from the electric control push rod 48. The levers 46 are rotationally connected to the support platform through the first rotating shaft. Since the third gear 50 is sleeved with the first rotating shaft, the third rack 49 is meshed with the third gear 50, thereby driving the levers 46 to rotate clockwise, folding the connected plastic bags once, and conveying the folded sections to the bottom of the storage tank 57. Since the third rack 49 and the fourth rack 52 are fixedly connected to the two ends of the traction rope 51 respectively, and several pressure rods 47 are rotationally connected to the support platform through the second rotating shaft.

The fourth gear 53 is sleeved with the second rotating shaft. Since the fourth gear 53 is meshingly connected with the fourth rack 52, in the initial state, the tension spring 54 is in a stretched state. Therefore, when the third rack 49 slides away from the end portion of the electric control push rod 48, the tension momentarily relaxes, and the tension spring 54 changes from stretching to tensioning, thereby driving the fourth rack 52 to slide away from the end of the traction rope 51, thereby driving the fourth gear 53 to rotate clockwise, and then making the several pressure rods 47 rotate clockwise, pressing the subsequent section of the connected plastic bag bodies once, so that the first section of the connected plastic bag bodies is S-shaped and retracted to the inside of the storage tank 57.

The upper stoppers 56, the lower stoppers 55 and the two baffles 58 are all used to block outer walls of the plastic bag bodies to prevent them from escaping from the storage groove 57. After the first fresh-keeping bag is folded, it is cut and sealed by the cutting assembly and the edge sealing assembly, thereby completing the production and folding of the first fresh-keeping bag, and so on, until all connected plastic bag bodies are made into several fresh-keeping bags and folded. When the production is completed, the folded fresh-keeping bags can be taken out from the top of the processing table.

The invention claimed is:

1. An all-in-one machine for folding and boxing fresh-keeping bags, the all-in-one machine comprising: a base, an unwinding roller (1) rotationally arranged on the base for holding rolled fresh-keeping bags, a controller, a traction mechanism (2), a loosening prevention mechanism (3) and a folding mechanism, wherein on the base is provided a support frame (5), the traction mechanism (2) is arranged on the support frame (5) for pulling rolled fresh-keeping bags, the traction mechanism (2) comprises a pushing assembly (6) and four suction cups (7), the pushing assembly (6) is arranged on the support frame (5), the four suction cups (7) are fixedly arranged on the pushing assembly (6), the loosening prevention mechanism (3) is arranged between the traction mechanism (2) and the folding mechanism to prevent the rolled fresh-keeping bags from loosening during transportation, and comprises a sliding assembly (8), a rotating assembly (9) and a top plate (10); on the base is provided a first vertical plate, the sliding assembly (8) is arranged on the first vertical plate, the rotating assembly (9) is inserted into the first vertical plate, the top plate (10) is sleeved on the rotating assembly (9), the folding mechanism is arranged on the base to individually fold fresh-keeping bags after being cut, and comprises a cutting assembly (11), an edge sealing assembly (12) and two folding assemblies (13); on the base is fixedly provided a support platform (14), both of the cutting assembly (11) and the edge sealing assembly (12) are arranged on the support platform (14), the cutting assembly (11) is located above the edge sealing assembly (12), both of the two folding assemblies (13) are located below the edge sealing assembly (12), and the pushing assembly (6), and the cutting assembly (11), the edge sealing assembly (12) and the two folding assemblies (13) are all electrically connected to the controller.

2. The all-in-one machine for folding and boxing fresh-keeping bags according to claim 1, wherein the pushing assembly (6) comprises an electric push rod (15), a sliding block (16) and a mounting plate (17), the sliding block (16) is arranged on the support frame (5), the electric push rod (15) is fixedly arranged on the support frame (5), an output end portion of the electric push rod is fixedly connected to the sliding block (16), the mounting plate (17) is fixedly arranged on an outer wall of the sliding block (16) at one end portion away from the electric push rod (15), the four suction cups (7) are symmetrically arranged at a bottom portion of the mounting plate (17), and the electric push rod (15) is electrically connected to the controller.

3. The all-in-one machine for folding and boxing fresh-keeping bags according to claim 2, wherein the sliding assembly (8) comprises a pull rope (18), a first rack (19) and a return spring (20), on the first vertical plate is fixedly arranged a guide rail, the first rack (19) is slidably arranged inside the guide rail, the pull rope (18) is fixedly arranged between the mounting plate (17) and the first rack (19), the return spring (20) is fixedly arranged between an end portion of the first rack (19) away from the pull rope (18) and an inner wall of the guide rail, and two transmission wheels are hingedly arranged on the first vertical plate, and both of the transmission wheels are sleeved with the pull rope (18).

4. The all-in-one machine for folding and boxing fresh-keeping bags according to claim 3, wherein the rotating assembly (9) comprises a first gear (21), a driving wheel (22), a driven wheel (23) and a belt (24), a first hinge shaft and a second hinge shaft are respectively inserted into the first vertical plate, the first gear (21) and the driving wheel (22) are both sleeved on the first hinge shaft, the driven wheel (23) is sleeved on the second hinge shaft; the top plate (10) is sleeved on the second hinge shaft, the belt (24) is sleeved between the driving wheel (22) and the driven wheel (23), the first gear (21) and the first rack (19) are meshed and connected, and the driving wheel (22) is larger than the driven wheel (23).

5. The all-in-one machine for folding and boxing fresh-keeping bags according to claim 4, wherein the edge sealing assembly (12) comprises a long-axis cylinder (25) and two heating blocks (26), the long-axis cylinder (25) is fixedly arranged on the support platform (14), an output end portion of the long-axis cylinder (25) is fixedly connected to one of a plurality of mounting blocks (27) away from the long-axis cylinder (25), a through slot for fresh-keeping bags to pass through is provided on the support platform (14), the plurality of mounting blocks (27) are slidably provided at both end portions of the through slot, the heating blocks (26) are fixedly provided on outer walls of the plurality of mounting blocks (27), a second rack (28) is fixedly provided at end portions of the plurality of mounting blocks (27) away from the long-axis cylinder (25), a second gear (29) is rotationally provided at end portions of the support platform (14) close to a top portion of the second rack (28), the second rack (28) is in meshed connection to the second gear (29), and the long-axis cylinder (25) and the heating blocks (26) are electrically connected to the controller.

6. The all-in-one machine for folding and boxing fresh-keeping bags according to claim 5, wherein the cutting assembly (11) comprises a cutter (30) and a cutter holder (31), the cutter (30) is fixedly arranged on one of the plurality of mounting blocks (27), and the cutter holder (31) is fixedly arranged on another one of the plurality of mounting blocks (27), and a cutter groove is provided on the cutter holder (31) for inserting the cutter (30).

7. The all-in-one machine for folding and boxing fresh-keeping bags according to claim 6, wherein the folding assemblies (13) comprise servo motors (32), rotating shafts (33) and arc-shaped top blocks (34), the rotating shafts (33) are inserted into outer walls of the support frame (5), arc-shaped top blocks (34) are symmetrically arranged at both end portions of the rotating shafts (33), the servo motors (32) are fixedly arranged on outer walls of the support platform (14), output end portions of the servo motors (32) are fixedly connected to end portions of the rotating shafts (33), and the servo motors (32) are electrically connected to the controller.

8. The all-in-one machine for folding and boxing fresh-keeping bags according to claim 7, wherein a second vertical plate is fixedly provided on the base, a limit roller (35) is rotationally provided on the second vertical plate, a conveying roller (36) is inserted below the limit roller (35) via a third hinge shaft, a stepper motor (37) is fixedly provided on the second vertical plate, an output end portion of the stepper motor (37) is fixedly connected to one end portion of the third hinge shaft, and the stepper motor (37) is electrically connected to the controller.

9. The all-in-one machine for folding and boxing fresh-keeping bags according to claim 8, wherein an arc-shaped limiting groove (38) is fixedly provided on the support platform (14), a support seat (39) is fixedly provided on the base, a storage box (40) is provided on the support seat (39), and the storage box (40) is located below the arc-shaped top blocks (34).

10. The all-in-one machine for folding and boxing fresh-keeping bags according to claim 7, wherein a reduction motor (41) is fixedly provided on the outer wall of the support platform (14), and a winding roller (42) is fixedly provided on an output end portion of the reduction motor (41).

* * * * *